US009407374B2

(12) United States Patent
Wahls et al.

(10) Patent No.: US 9,407,374 B2
(45) Date of Patent: Aug. 2, 2016

(54) NONLINEAR FOURIER ANALYSIS IN OPTICAL SYSTEMS

(71) Applicants: Sander Wahls, Delft (NL); Harold Vincent Poor, Princeton, NJ (US)

(72) Inventors: Sander Wahls, Delft (NL); Harold Vincent Poor, Princeton, NJ (US)

( * ) Notice: Subject to any disclaimer, the term of this patent is extended or adjusted under 35 U.S.C. 154(b) by 36 days.

(21) Appl. No.: 14/463,319

(22) Filed: Aug. 19, 2014

(65) Prior Publication Data

US 2015/0078750 A1 Mar. 19, 2015

Related U.S. Application Data

(60) Provisional application No. 61/867,212, filed on Aug. 19, 2013.

(51) Int. Cl.
  H04B 10/69 (2013.01)
  H04B 10/61 (2013.01)
  H04B 10/516 (2013.01)
  H04L 27/26 (2006.01)

(52) U.S. Cl.
  CPC .............. *H04B 10/516* (2013.01); *H04B 10/69* (2013.01); *H04L 27/265* (2013.01); *H04L 27/2628* (2013.01)

(58) Field of Classification Search
  CPC .............................. H04B 10/616; H04B 10/69
  See application file for complete search history.

(56) References Cited

U.S. PATENT DOCUMENTS 7,860,406 B2 * 12/2010 Xie ..................... H04B 10/671
                                          398/203

OTHER PUBLICATIONS

M. Yousefi et al., "Communication over Fiber-optic Channels using the Nonlinear Fourier Transform", IEEE ISIT 2013, Jul. 7-12, 2013.*
P. Prenter, "Matrix Representations of Polynomial Operators", Rendiconti del Circolo Matematico di Palermo, Jan. 1972, vol. 21, Issue 1, pp. 103-118.*
M. I. Yousefi and F.R. Kschischang, "Information transmission using the nonlinear Fourier transform, Part I: Mathematical tools", Univ. Toronto, Toronto, Canada, Mar. 2013.
M. I. Yousefi and F.R. Kschischang, "Information transmission using the nonlinear Fourier transform, Part II: Numerical methods", Univ. Toronto, Toronto, Canada, Mar. 2013.
J. Armstrong, "OFDM for optical communications," J. Lightwave Technol., vol. 27, No. 3, pp. 189-204, 2009.
E. Meron, M. Feder, and M. Shtaif, "On the achievable communication rates of generalized soliton transmission systems," ArXiv, Jul. 2012.

(Continued)

Primary Examiner — Shi K Li
(74) Attorney, Agent, or Firm — Meagher Emanuel Laks Goldberg & Liao, LLP.

(57) ABSTRACT

A receiver configured to receive wave packets encoded with data via a nonlinear channel is disclosed. The receiver includes an input configured to receive the wave packets from the non-linear channel. The receiver also includes a processor configured to generate a transfer matrix from the received wave packets and find the representation of the transfer matrix as ratios of polynomials and compute the non-linear Fourier spectrum in which the data has been embedded. The receiver may also include a demodulator configured to demodulate the non-linear Fourier spectrum to recover the data. Periodic boundary conditions may be selected. Boundary conditions may be selected based on a non-periodic vanishing signal. The received wave packets may be configured as solitons. The nonlinear channel may be an optical channel.

23 Claims, 4 Drawing Sheets

(56) References Cited

OTHER PUBLICATIONS

Sander Wahls, and H. Vincent Poor, "Fast Numerical Nonlinear Fourier Transforms", arXiv, Feb. 2014.
Son Thai Le, Jaroslaw E. Prilepsky, and Sergei K. Turitsyn, "Nonlinear inverse synthesis for high spectral efficiency transmission in optical fibers", Optical Society of America, 2014.
Siddarth Hari, Frank Kschischang, Mansoor Yousefi, "Multi-eigenvalue Communication Via the Nonlinear Fourier Transform", IEEE, 2014.
Qun Zhang, Terence H. Chan, and Alex Grant, "Spatially Periodic Signals for Fiber Channels", IEEE International Symposium on Information Theory, 2014.
Akira Hasegawa, and Takayuki Nyu, "Eigenvalue Communication", Journal of Lightwave Technology, 11, 3, Mar. 1993.
Jaroslaw E. Prilepsky, Stanislav A. Derevyanko, and Sergei K.Turitsyn, "Nonlinear spectral management: Linearization of the lossless fiber channel", Optics Express, 21, 20, Oct. 2013.
Elena G. Turitsyna and Sergei K. Turitsyn, "Digital signal processing based on inverse scattering transform", Optics Letters, 38, Oct. 20, 2013.
Jaroslaw E. Prilepsky, Stanislav A. Derevyanko et al., "Nonlinear Inverse Synthesis and Eigenvalue Division Multiplexing in Optical Fiber Channels", Physical Review Letters, 113, Jul. 2014.
Sander Wahls and H. Vincent Poor, "Inverse Nonlinear Fourier Transforms Via Interpolation:The Ablowitz-Ladik Case", 21st International Symposium on Mathematical Theory of Networks and Systems, Jul. 7-11, 2014.
W. Clay Choate, "A fast algorithm for normal incidence seismograms", Geophysics, vol. 47, No. 2, Feb. 1982.
G. Boffetta and A. R. Osborne, "Computation of the Direct Scattering Transform for the Nonlinear Schroedinger Equation", Journal of Computational Physics 102, 1992.
T. Dudok De Wit, "Data Analysis Techniques for Resolving Nonlinear Processes in Space Plasmas : a Review", The URSI Review on Radio Science 1993-1995, 1996.
V. E. Zakharov and A. B. Shabat, "Exact Theory of Two-Dimensional Self-Focusing and Onedimensional Self-Modulation of Waves in Nonlinear Media", Soviet Physics Jetp, vol. 34 No. 1, 1972.
J.A.C. Weideman and B_M_ Herbst, "Finite Difference Methods for an AKNS Eigenproblem", 1995.
M. J. Ablowitz and J. F. Ladik, "Nonlinear differential—difference equations and Fourier analysis", Journal of Mathematical Physics 17, 1011, 1976.
A. R. Osborne, "Nonlinear Fourier Analysis for the Infinite-Interval Korteweg-de Vries Equation 1: An Algorithm for the Direct Scattering Transform", Journal of Computational Physics 94, 1991.
A.R. Osborne, "Nonlinear Fourier Analysis of Shallow Water Waves", 1998.
E. R. Tracy and H. H. Chen, "Nonlinear self-modulation: An exactly solvable model", Physical Review A vol. 37, No. 3, Feb. 1988.
A.R. Osborne, "Numerical inverse scattering transform for the periodic, defocusing nonlinear Schrodinger equation", Physics Letters A 176, 1993.
E. R. Tracy, H. H. Chen, and Y. C. Lee, "Study of Quasiperiodic Solutions of the Nonlinear Schrodinger Equation and the Nonlinear Modulational Instability", Physical Review Letters vol. 53, No. 3, Jul. 1984.
Mark J. Ablowitz, David J. Kaup, Alan C. Newell and Harvey Segur, "The Inverse Scattering Transform-Fourier Analysis for Nonlinear Problems", Studies in Applied Mathematics. vol. LIII, No. 4, Dec. 1974.
Yan-Chow MA and Mark J. Ablowitz, "The Periodic Cubic Schrodinger Equation", Studies in Applied Mathematics 65, 1981.
Eugene Raymond Tracy, "Topics in Nonlinear Wave Theory With Applications", 1984.

* cited by examiner

NONLINEAR FOURIER ANALYSIS IN OPTICAL SYSTEMS

CROSS-REFERENCE TO PRIOR FILED APPLICATIONS

This application claims the benefit of U.S. Provisional Application No. 61/867,212 filed Aug. 19, 2013, which is incorporated herein in its entirety.

STATEMENT REGARDING FEDERALLY SPONSORED RESEARCH OR DEVELOPMENT

This invention was made with government support under Grant No. N00014-12-1-0767 awarded by the Office of Naval Research. The government has certain rights in this invention.

TECHNICAL FIELD

The present disclosure generally relates to the field of transmitters and receivers configured for data transmission systems using a nonlinear channel and in more particular to optical transmitters and receivers configured for use with optical channels.

BACKGROUND OF THE INVENTION

The inverse scattering method for solving nonlinear evolution equations, which are a special kind of differential equations, goes back to Gardner et al. It can be thought of as a generalization of Fourier's method for solving the heat equation. The idea is that the time-evolution of a signal governed by some evolution equation might be trivial in the (nonlinear) Fourier domain where a space-time signal is expressed in terms of suitably chosen waves. To determine the temporal evolution of a spatial signal (or vice versa, the spatial evolution of a temporal signal) in a medium, a suitable nonlinear Fourier transform of the signal is computed and the temporal (or spatial) evolution of the signal is performed in the nonlinear Fourier domain. Eventually, an inverse nonlinear Fourier transform is used to recover the evolved signal at the desired time. The nonlinear Fourier transforms disclosed herein are true generalizations of the common Fourier transform. They enable the analysis and synthesis of functions in terms of non-sinusoidal wave forms that are fundamental in several important physical setups, such as light waves in optical fiber. It is therefore desirable to provide improved techniques for implementing nonlinear Fourier transforms and inverse nonlinear Fourier transforms.

BRIEF SUMMARY OF THE INVENTION

A receiver configured to receive wave packets encoded with data via a nonlinear channel is disclosed. The receiver includes an input configured to receive the wave packets from the non-linear channel. The receiver also includes a processor configured to generate a transfer matrix from the received wave packets and find the representation of the transfer matrix as ratios of polynomials and compute the non-linear Fourier spectrum in which the data has been embedded. The receiver may also include a demodulator configured to demodulate the non-linear Fourier spectrum to recover the data. Periodic boundary conditions may be selected. Boundary conditions may be selected based on a non-periodic vanishing signal. The processor may be further configured to detect remaining wave components. The processor may be further configured to detect data embedded in coefficients of the polynomials of an inferred transfer matrix. The received wave packets may be configured as solitons. The nonlinear channel may be an optical channel. The receiver may also include an equalizer configured to revert a spatial evolution of the received wave packets.

The processor may be configured to find the transfer matrix representation of the received wave packets in terms of ratios of polynomials by: i) sampling the received wave packets, ii) generating a plurality of input data sample matrices, each input data sample matrix being a ratio of polynomials for each sample of the received wave packets, iii) multiplying the plurality of input data sample matrices using tree-wise processing and fast methods to compute intermediate products of polynomials, and iv) normalizing the intermediate products after each multiplication of matrices. The polynomials may be represented with a monomial basis and a fast Fourier transform is used to compute the intermediate products. The polynomials may be represented with a monomial basis and a discrete Hartley transform is used to compute the intermediate products. The polynomials may be represented with a Chebychev basis and a discrete cosine transform is used to compute the intermediate products.

A method of receiving wave packets encoded with data via a nonlinear channel is also disclosed. The method includes receiving the wave packets from the non-linear channel; generating a transfer matrix from the received wave packets to find the representation of the transfer matrix as ratios of polynomials; and computing the non-linear Fourier spectrum in which the data has been embedded. The method may also include demodulating the non-linear Fourier spectrum to recover the data. Periodic boundary conditions may be selected. Boundary conditions may be selected based on a non-periodic vanishing signal. The method may include detecting remaining wave components. The method may include detecting data embedded in coefficients of the polynomials of an inferred transfer matrix. The received wave packets may be configured as solitons. The nonlinear channel may be an optical channel. The method may also include reverting a spatial evolution of the received wave packets, e.g., by using an equalizer.

The method may include finding the transfer matrix representation of the received wave packets in terms of ratios of polynomials by: i) sampling the received wave packets, ii) generating a plurality of input data sample matrices, each input data sample matrix being a ratio of polynomials for each sample of the received wave packets, iii) multiplying the plurality of input data sample matrices using tree-wise processing and fast methods to compute intermediate products of polynomials, and iv) normalizing the intermediate products after each multiplication of matrices. The polynomials may be represented with a monomial basis and a fast Fourier transform is used to compute the intermediate products. The polynomials may be represented with a monomial basis and a discrete Hartley transform is used to compute the intermediate products. The polynomials may be represented with a Chebychev basis and a discrete cosine transform is used to compute the intermediate products.

DETAILED DESCRIPTION OF THE INVENTION

Figure 1:
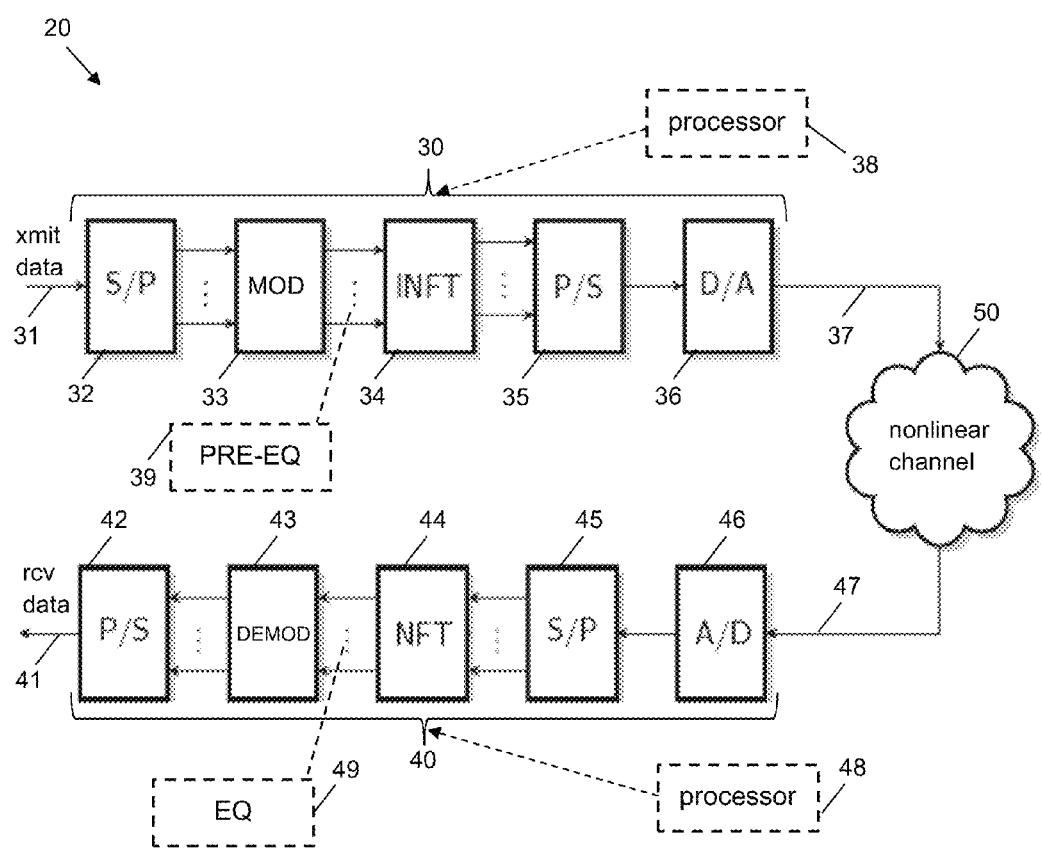
FIG. 1 is a block diagram of an optical communications system with a nonlinear channel.

Disclosed is a computer-implemented system for use, for example, for optical or underwater communications, compression of audio and/or video, analysis of oceanic time-series, or the solution of differential equations, employing one or more of several disclosed fast nonlinear Fourier transform (NFT) methods. The disclosed process may be implemented with a processor configured to decompose a signal governed by the focusing nonlinear Schrödinger equation into basic elementary wave forms. The disclosed approach is fundamentally faster than other known approaches. The focusing nonlinear Schrödinger equation describes the evolution of waveforms in several scenarios of interest. Examples are data signals in optical fiber, surface waves in deep water, and plasma waves. An immediate application is the analysis of data that has been recorded in these scenarios.

The work on this problem is also applicable to optical communication systems that use a nonlinear Fourier transform for the generation of data-bearing signals for transmission and extraction of data from the received signal as disclosed in more detail below. It should be understood that the disclosed techniques may be applied to other media described by the focusing nonlinear Schrödinger Equation including surface waves in deep water and plasma waves as well as media described by other evolution equations for which nonlinear Fourier transforms are known such as the defocusing nonlinear Schrödinger equation or the Korteweg-de Vries equation. Similar to the orthogonal frequency division multiplexing (OFDM) used in modern wireless systems, where data is embedded in the amplitudes and phases of sinusoids with different frequencies, the nonlinear Fourier transform is used to embed data in physically sustainable waveforms of the nonlinear channel in this system. Current optical OFDM technology ignores the nonlinearities of the optical channel and embeds data in sinusoids although they are not physically sustainable wave-forms in optical fiber. The advantage of this approach is that the highly efficient fast Fourier transform algorithm can be utilized which is essential in managing the high computational demand that arises from the high data rates in optical communications. The downside is that the sinusoids will degrade while they travel through the fiber and interfere which each other. In modern optical fiber communications, where multiple users are sharing fibers by using sinusoids with different frequencies and data is routed through networks of fibers, a single user cannot remove the undesired part of the received signal that arises from the interference with other users because the users are usually spatially separated and do not know the received signals of other users. This effect puts a fundamental limit on the capacity of optical fiber communications employing sinusoids.

Such optical communication systems may use a nonlinear Fourier transform to embed data in waveforms that do not degrade and remain separable while traveling through the fiber. However, the lack of a fast nonlinear Fourier transform that is comparable to the common fast Fourier transform has been identified as a major problem for the practical realization. The disclosed approach closes this gap. Also disclosed herein is a simple approach to the inverse nonlinear Fourier transform for the nonlinear Schrödinger equation that can be used to synthesize data-bearing inputs for the channel that is computationally more efficient than currently known techniques.

FIG. 1 is a block diagram of an optical system 20 with a nonlinear channel 50. The system 20 includes a transmitter 30 and a receiver 40. It should be understood that the transmitter 30 and a receiver 40 may be implemented in a combination of hardware and software broken down into several functional blocks as generally shown by reference numbers 32-36 and 42-46. It should also be understood that one or more of these functional blocks may be implemented with a processor as generally shown by blocks 38 and 48. It should be understood that data for transmission over the channel 50 as well as data that is received over the channel 50 may be routed to/from other system components that are well known in the art and not shown for purposes of clarity.

The receiver 30 has an electrical input 31 (digital) configured to receive an electrical input and generate an optical output signal via an optical output 37. In this example, the input signal is digital serial data for transmission over the channel 50. The input signal is coupled to the electrical input 31 of serial/parallel converter as shown by block 32. The output of the serial/parallel converter 32 (xmit data) is coupled to a modulator 33. The output of the modulator 33 is coupled to an inverse nonlinear Fourier transform (INFT) module 34 for transformation of the xmit data from the Fourier domain to the time (or spatial) domain. The output of the INFT module 34 is coupled to a parallel/serial converter 35 for conversion of the xmit data to a serial data stream. The output of the parallel/serial converter 35 is coupled to a digital/analog converter 36 prior to transmission over the channel 50. It should be understood that one or more optical drivers may be used to transmit the xmit data over the channel 50.

The transmitter 40 has an optical input 47 configured to receive the data transmitted over the channel 50 (rcv data) and generates an electrical output signal via electrical output 41. The rcv data is coupled to an analog/digital converter 46 for conversion to an electrical signal (digital). The output of the analog/digital converter 46 is coupled to a serial/parallel converter as shown by block 45. The output of the serial/parallel converter 45 is coupled to a nonlinear Fourier transform (NFT) module 44 for transformation of the rcv data from the time (or spatial) domain to the Fourier domain. The NFT module 43 transforms the received data transmitted over the channel 50 back into the nonlinear Fourier domain. The output of the NFT module 43 is coupled to a demodulator 43. The output of the demodulator 43 is coupled to a parallel/serial converter 42 for conversion to a serial data format. The implementation of serial/parallel and parallel/serial conversion functional blocks 32, 35, 42 and 45 can be accomplished via a variety of well-known approaches. Similarly, the implementation of the A/D, D/A and the modulator/demodulator functional blocks 33, 36, 43 and 46 can be accomplished via a variety of well-known approaches. It should be understood that the order in which the function blocks 32-36 and 42-46 may be varied without departing from the scope of this disclosure. The implementation of the INFT and NFT functional blocks 34 and 44 are disclosed in detail herein. In cases where data is embedded in parts of the nonlinear Fourier spectrum that changes while the signal propagates through the nonlinear channel, an equalizer 49 or, alternatively, a pre-equalizer 39 may be used to revert, or pre-compensate, respectively, for these changes. This operation is simple in the non-linear Fourier domain.

Figure 2:
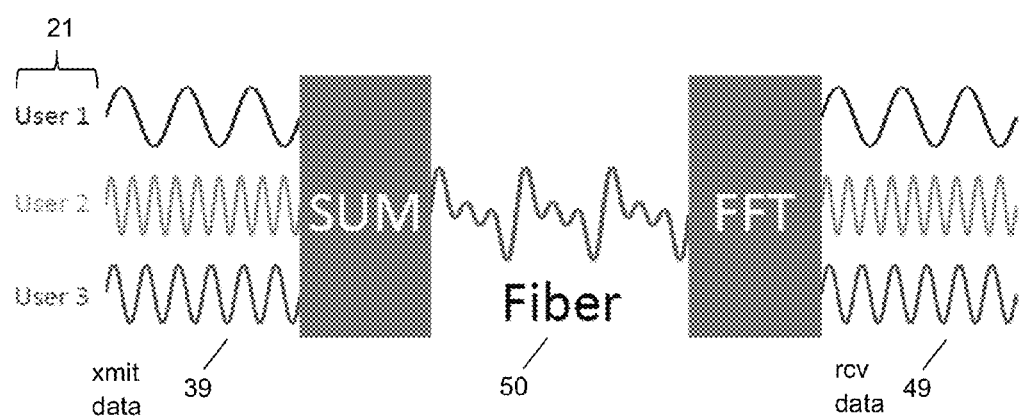
FIG. 2 is a simplified block diagram showing conventional transmission of data from several users via an nonlinear channel.

FIG. 2 is a simplified block diagram showing transmission of data from several users via optical channel 50 employing sinusoids. Typically the users 21 access fibers making up channel 50 in parallel at different wavelengths. But fiber is nonlinear. In lossless fibers, ignoring noise, the field envelope $u(x, t)$ obeys the nonlinear Schrödinger Equation (NSE):

$$i\frac{\partial u}{\partial x} = \frac{\partial^2 u}{\partial t^2} + 2u|u|^2$$

In general, transmission systems based on sinusoids experience degradation making decoding difficult. Optical systems based on modulation of sinusoids are currently close to their maximum number of bits/sec. Another approach is to transmit solitons (self-reinforcing solitary waves). Solitons are basically single humps of light that maintain their shape while traveling at constant speed as is known in the art. They occur when dispersive and non-linear effects cancel. They are remarkably stable which makes them ideal carriers for a bit of information. Problems arise since there is a need to pack the solitons tightly to achieve competitive data rates. The generation of initial conditions that lead to solitonic wave-packets traveling through the fiber is difficult because of the nonlinear effects unless nonlinear Fourier transforms are used. Several well-known evolution equations have soliton solutions, including the focusing nonlinear Schrödinger equation. The soliton solutions are typically obtained by means of the inverse nonlinear Fourier transform and the data is recovered using a forward transform. Currently, there are no fast algorithms comparable to the FFT. Disclosed herein is a nonlinear FFT implementation capable of the fast implantation and use in high speed data systems using a nonlinear, e.g., optical, channel.

The fast numerical NFT disclosed below is based on a transformation of the problem such that it can be solved efficiently using specialized algorithms for polynomial root-finding and multi-point evaluation. Additional details are disclosed in Wahls and Poor, *Fast Numerical Nonlinear Fourier Transforms*, Submitted to *IEEE Transactions on Information Theory*, September 2013. arXiv:1402.1605 [cs.IT] (Submitted on 7 Feb. 2014) a copy of which was also included in U.S. Provisional Application No. 61/867,212, filed Aug. 19, 2013, both of which are incorporated herein in their entirety. See also Wahls and Poor, *Introducing the fast nonlinear Fourier transform*, Proc. IEEE International Conference on Acoustics, Speech, and Signal Processing (ICASSP), Vancouver, Canada, May 2013 which is also incorporated herein in its entirety.

The nonlinear Fourier spectrum of a signal is found by analyzing the associated transfer (or scattering) matrix $T(z)$, which is a matrix that depends on a complex parameter $z$. For the numerical computation of the nonlinear Fourier spectrum, an approximation of the true transfer matrix in terms of ratios of polynomials is found from samples of the signal. However, this approximation is initially given as a product of many single matrices. An important aspect of a fast numerical nonlinear Fourier transform is that this product representation has to be transformed quickly into a standard form for further processing. The further processing involves polynomial root finding problems and the sampling of polynomials at many points for polynomials which are derived from the transfer matrix. These problems can be solved very efficiently once the standard representation of the polynomials is known.

Figure 3A:
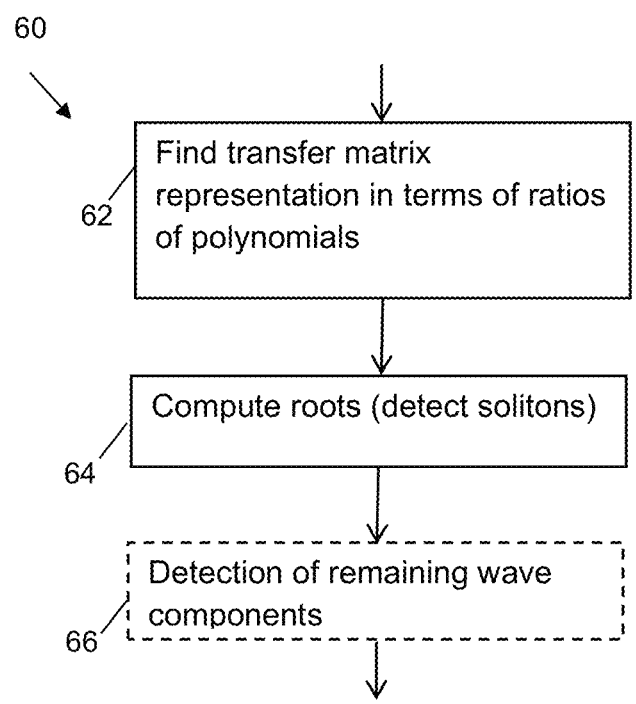
FIG. 3A is a block diagram showing the basic structure of a fast numerical nonlinear Fourier transform module.

FIG. 3A is a block diagram showing the basic structure 60 of a fast numerical nonlinear Fourier transform. It should be understood that boundary conditions must be selected prior to solving the nonlinear Schrödinger Equation (NSE). One approach is to assume boundary conditions where a non-periodic vanishing signal decays sufficiently rapidly as $|x| \to \infty$. Another approach is to assume periodic boundary conditions since some systems may use a cyclic prefix.

The basic structure 60 of a fast numerical nonlinear Fourier transform mathematical as set out mathematically above is generally broken down into two or more functional blocks. For vanishing boundary conditions the functional blocks are: finding a representation of the transfer matrix as ratios of polynomials as shown generally by block 62 and computing roots (detection of data or solitons) as generally shown by block 64. For periodic boundary conditions the overall approach can be used with minimal modifications, only a few implementation details have to be changed. The transfer matrix is replaced with a monodromy matrix, whose analytical derivation is almost identical to the transform matrix except for the changed boundary conditions. Nothing changes from a numerical point of view because the method mentioned above for finding the standard form of the transfer matrix can still be applied to transform the monodromy matrix into standard form. The functions whose roots constitute the nonlinear Fourier spectrum are different, but they can be computed from the numerical approximation of the transfer matrix in standard form easily.

A basic approach for finding a representation of the transfer matrix as ratios of polynomials, where the polynomials are given in a standard representation, is as follows. In general each sample of the input data yields a matrix of ratios of polynomials, where all polynomials have a low degree. The input data sample matrices must be multiplied quickly to find a standard representation of the transfer matrix. The product of these input data sample matrices will comprise polynomials of much higher degrees. Finding the high degree polynomials from the input data sample matrices creates a processing bottleneck. High speed processing is possible using a tree-wise multiplication. In order to avoid numerical problems (under-/overflow), the intermediate products are normalized while the algorithm traverses the tree.

A processor is generally configured to generate a transfer matrix from the received wave packets and find the representation of the transfer matrix as ratios of polynomials and compute the non-linear Fourier spectrum in which the data has been embedded. The representation of the transfer matrix in terms of ratios of polynomials enables the use of fast methods for performing further operations on polynomials that are necessary in order to compute the nonlinear Fourier spectrum. The transfer matrix $T(z)$ is generated from a plurality of samples of the received wave packets:

$T(z) \approx R_1(z) \times R_2(z) \times R_3(z) \times R_4(z) \times R_5(z) \times R_6(z)$ Fast multiply $R_1$ and $R_2$; $R_3$ and $R_4$; and $R_5$ and $R_6$;

$\approx R_1 R_2(z) \times R_3 R_4(z) \times R_5 R_6(z)$

Normalize;

$\approx \text{const} \times R_1 \tilde{R}_2(z) \times R_3 \tilde{R}_4(z) \times R_5 \tilde{R}_6(z)$ Fast multiply terms and normalize $\approx \text{const} \times R_1 R_2 \tilde{R}_3 R_4(z) \times R_5 \tilde{R}_6(z)$ Fast multiply terms and normalize $\approx \text{const} \times R_1 R_2 R_3 \tilde{R}_4 R_5 R_6(z)$ This yields an approximation of the transfer matrix in standard form (i.e., coefficients of the numerator and denominator polynomials with respect to a basis, e.g., monomials 1, x, $x^2$, $x^3$, ... ). The $R_i$ terms are rational, i.e., $$R_1 = \frac{s_i}{d_i}$$

where $s_i$ is a matrix of polynomials and $d_i$ is a scalar polynomial. The degrees of the polynomials necessary to define the $s_i$ and $d_i$ all low ($\leq K$).

Figure 3B:
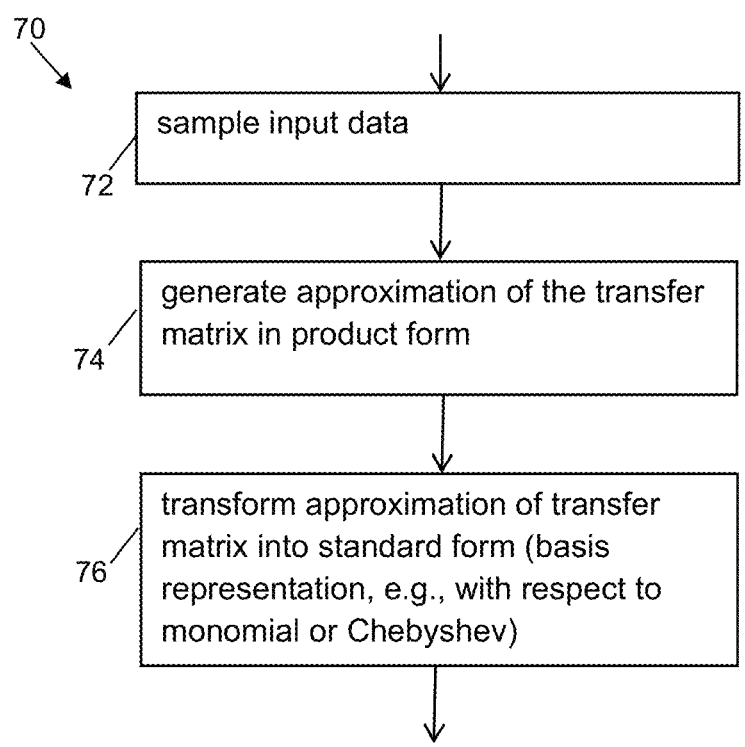
FIG. 3B is a block diagram showing the basic structure for finding a representation of a transfer matrix as ratios of polynomials.

FIG. 3B is a block diagram showing the basic structure for finding a representation of the transfer matrix as ratios of polynomials 70. In general, the functional blocks are: sampling the input data as shown by block 72 (e.g., every 10 ms); generating a matrix for each sample generating an approximation of the transfer matrix in product form as shown by block 74; multiplying the input data sample matrices quickly using, e.g., standard FFTs and tree-wise processing transforming the approximation of transfer matrix into standard form (coefficients, e.g., with respect to the monomial or Chebyshev basis) as shown by block 76. As discussed above, the binary representation may be normalized after each multiplication. In the case of boundary conditions selected based on a non-periodic vanishing solitons may be detecting by computing the roots of the upper left element of the transfer matrix. The remaining components may be detected by sampling the first column of the transfer matrix quickly and computing their ratios.

The inverse nonlinear Fourier transform (INFT) module 33 may be implemented using the techniques disclosed in Wahls and Poor, Inverse Nonlinear Fourier Transforms Via Interpolation: The Ablowitz-Ladik Case, *Proc. International Symposium on Mathematical Theory of Networks and Systems* (*MTNS*), Groningen, The Netherlands, July 2014 (Invited paper) which is incorporated herein in its entirety.

It should be understood that many variations are possible based on the disclosure herein. Although features and elements are described above in particular combinations, each feature or element can be used alone without the other features and elements or in various combinations with or without other features and elements. The methods or flow charts provided herein may be at least partially implemented in a computer program, software, firmware incorporated in a non-transitory computer-readable storage medium for execution by a general purpose computer or a processor. Examples of computer-readable storage mediums include but are not limited to read only memory (ROM), a random access memory (RAM), a register, cache memory, semiconductor memory devices, magnetic media such as internal hard disks and removable disks, magneto-optical media, and optical media.

What is claimed is:

1. A receiver configured to receive wave packets encoded with data via a nonlinear channel, the receiver comprising:
   an input configured to receive the wave packets from the nonlinear channel;
   a processor configured to:
     generate a transfer matrix from the received wave packets;
     find the representation of the transfer matrix in terms of ratios of polynomials by multiplying a plurality of sample matrices using tree-wise processing; and
     compute a nonlinear Fourier spectrum derived from the polynomials using polynomial multi-point evaluation or polynomial root-finding; and
   a demodulator configured to demodulate the non-linear Fourier spectrum to recover the data.

2. The receiver of claim 1 wherein the processor is further configured to assume the wave packets have periodic boundary conditions.

3. The receiver of claim 1 wherein the processor is further configured to assume the wave packets have vanishing boundary conditions.

4. The receiver of claim 3 wherein non-solitonic components of the wave packets are modulated.

5. The receiver of claim 3 wherein solitonic components of the wave packets are modulated.

6. The receiver of claim 1 wherein the nonlinear channel is an optical channel.

7. The receiver of claim 1 further comprising an equalizer configured to revert a spatial evolution of the received wave packets.

8. The receiver of claim 1 wherein the processor is configured to find the transfer matrix representation of the received wave packets in terms of ratios of polynomials by:
   sampling the received wave packets;
   generating a plurality of input data sample matrices, each input data sample matrix containing ratios of polynomials for each sample of the received wave packets;
   multiplying the plurality of input data sample matrices by computing intermediate products of polynomials; and
   normalizing the intermediate products after each multiplication of matrices.

9. The receiver of claim 8 wherein the polynomials are represented with a monomial basis and the processor is further configured to compute the intermediate products with a Fourier transform.

10. The receiver of claim 8 where the polynomials are represented with a monomial basis and the processor is further configured to compute the intermediate products with a discrete Hartley transform.

11. The receiver of claim 8 where the polynomials are represented with a Chebyshev basis and the processor is further configured to compute the intermediate products with a discrete cosine transform.

12. A method of receiving wave packets encoded with data via a nonlinear channel, the method comprising:
   receiving the wave packets from the non-linear channel;
   generating a transfer matrix from the received wave packets to find the representation of the transfer matrix in terms of ratios of polynomials by multiplying a plurality of sample matrices using tree-wise processing;
   computing a nonlinear Fourier spectrum derived from the polynomials using polynomial multi-point evaluation or polynomial root-finding; and
   demodulating the non-linear Fourier spectrum to recover the data.

13. The method of claim 12 further comprising selecting periodic boundary conditions.

14. The method of claim 12 further comprising selecting vanishing boundary conditions.

15. The method of claim 12 further comprising modulating solitonic components of the wave packets.

16. The method of claim 12 wherein the nonlinear channel is an optical channel.

17. The method of claim 12 further comprising reverting a spatial evolution of the received wave packets.

18. The method of claim 12 further comprising finding the transfer matrix representation of the received wave packets in terms of ratios of polynomials by:
   sampling the received wave packets;
   generating a plurality of input data sample matrices, each input data sample matrix containing ratios of polynomials for each sample of the received wave packets;

multiplying the plurality of input data sample matrices by computing intermediate products of polynomials; and normalizing the intermediate products after each multiplication of matrices.

19. The method of claim 18 further comprising computing the intermediate products with a Fourier transform, wherein the polynomials are represented with a monomial basis.

20. The method of claim 18 further comprising computing the intermediate products with a discrete Hartley transform, wherein the polynomials are represented with a monomial basis.

21. The method of claim 18 further comprising computing the intermediate products with a discrete cosine transform, wherein the Polynomials are represented with a Chebyshev basis.

22. The receiver of claim 7 wherein the processor is further configured to compute an inverse nonlinear Fourier transform.

23. A transmitter configured to transmit wave packets encoded with data via a nonlinear channel, the transmitter comprising:

a modulator configured to generate wave packets from the data;

a processor configured to:
    generate a transfer matrix from the wave packets;
    find the representation of the transfer matrix in terms of ratios of polynomials by multiplying a plurality of sample matrices using tree-wise processing; and
    compute a nonlinear Fourier spectrum derived from the polynomials using polynomial multi-point evaluation or polynomial root-finding;

a pre-equalizer configured to pre-compensate a spatial evolution of the wave packets;

an inverse nonlinear Fourier transform (INFT) module configured for transformation of the pre-equalized wave packets from a non-linear Fourier domain to a temporal domain; and an output configured to transmit the pre-equalized wave packets via the nonlinear channel.

\* \* \* \* \*